VOICE FREQUENCY HYBRID TELEPHONE REPEATER

Filed Oct. 7, 1960 2 Sheets-Sheet 1

INVENTORS
William Fingerle, Jr.
Earl F. Howlett
BY Moore & Hall
ATTORNEYS

April 6, 1965 W. FINGERLE, JR., ETAL 3,177,303

VOICE FREQUENCY HYBRID TELEPHONE REPEATER

Filed Oct. 7, 1960 2 Sheets-Sheet 2

INVENTORS

William Fingerle, Jr.
Earl F. Howlett

BY

Moore & Hall

ATTORNEYS

United States Patent Office 3,177,303

Patented Apr. 6, 1965

3,177,303
VOICE FREQUENCY HYBRID TELEPHONE REPEATER

William Fingerle, Jr., Cos Cob, and Earl F. Howlett, Stamford, Conn., assignors to Budelman Electronics Corporation, Stamford, Conn., a corporation of New York Filed Oct. 7, 1960, Ser. No. 61,259
7 Claims. (Cl. 179—170)

The present invention relates to a voice frequency repeater adapted to improve transmission on existing substandard subscriber and trunk circuits; and is more particularly concerned with an improved hybrid telephone repeater adapted to effect significant economies in installation, setup and maintenance.

As is well known at the present time, telephone lines are often associated with voice frequency repeaters located either at a central office or at a remote position between subscribers; and adapted to compensate for attenuation produced during voice transmissions, thereby to improve such transmissions. One well known form of voice frequency repeater is the so-called hybrid repeater which normally contains a pair of identical amplifiers, one for amplifying voice currents in a first direction, the second to increase the signal level of voice currents in an opposite direction; said amplifiers being prevented from interacting into one another by a directional circuit device known as a hybrid network. Known circuits of this type are generally complex and relatively bulky equipments representing costly installations. These known forms of circuits, moreover, are normally so arranged that they have at least four manually adjustable controls thereon, comprising a pair of hybrid balance controls and a pair of gain controls associated respectively with the two amplifiers discussed above; and these four controls must normally be manipulated simultaneously to set up the equipment for maximum gain and balance in both directions of transmission. The very nature of such structures suggested heretofore, and the form of setup controls normally provided, necessitated that highly specialized test equipment and technical know-how be utilized during an initial setup procedure; and in addition, the time required to set up such known forms of circuitry has been appreciable.

Field surveys have indicated, however, that in over 90% of all lines in need of voice frequency amplification, expensive repeaters of the type normally sold heretofore are actually unnecessary; being capable of voice amplifications and refinements of control far in excess of those actually required to effect a desired improvement in voice transmission quality. Moreover, the significant setup time and special test equipment which has necessarily been employed with voice frequency repeaters of types heretofore utilized has rendered the use of such equipments (particularly in light of their high initial cost) uneconomical in many installations.

The present invention, recognizing these characteristics of voice frequency repeaters suggested heretofore, is concerned with the provision of a highly simplified repeater which can be manufactured and sold at a fraction of the cost of equipments available heretofore. Moreover, the simplified equipment of the present invention is so constructed that it may be installed more quickly and easily than equipments suggested heretofore; and can in fact be adjusted to a given circuit without the use of special test equipment or technical know-how, and indeed, through the use of only a lineman's test hand set. The simplification in test equipment necessary with the present invention is further characterized by a setup time in the order of minutes, rather than hours which may have been necessary heretofore; thereby making the equipment feasible in many installations wherein complex test equipment and highly qualified personnel are not available.

With all the foregoing advantages, the present invention is, as will appear, further designed not only to improve transmission on existing circuits, but also to obtain considerable system construction economies by permitting the use of lower cost small size cable gauges and lower conductivity open wire facilities than have been considered economically feasible heretofore when only the more complex and costly equipments characteristic of the prior art have been available.

It is accordingly an object of the present invention to provide an improved voice frequency repeater which is simpler in construction and which can be installed more quickly and easily than has been possible heretofore.

A further object of the present invention resides in the provision of an improved voice frequency repeater which can be more rapidly set up and adjusted to a given circuit than has been possible heretofore; and in particular, wherein the equipment set up can be effected by relatively unskilled personnel and without the use of highly specialized test equipment.

Still another object of the present invention resides in the provision of an improved voice frequency repeater of the hybrid type which has fewer setup controls than has normally been the case hertofore; and in particular, resides in the provision of a repeater which employs a common gain control for both amplifiers thereof.

A still further object of the present invention resides in the provision of a voice frequency repeater adapted for use with both loaded and unloaded telephone lines, said repeater including a compensating network adapted to compensate the repeater for use with a given loaded line.

A still further object of the present invention resides in the provision of a voice frequency repeater which is more rugged and foolproof in circuit design, and which takes up less rack space and consumes less power than repeaters available heretofore.

In providing for the foregoing objects and advantages, the present invention contemplates the provision of a voice frequency hybrid telephone repeater designed to amplify speech currents in both directions on subscriber or trunk telephone lines. The repeater, as will be described, is provided with D.C. and ringing current bypass circuitry, and is fully transistorized, requiring only 4.0 milliamperes of operating power per repeater from a 12/24/48 volt D.C. operating battery. The repeater is compact and of rugged construction; and includes a pair of transistor amplifiers associated, as will be described, with various impedances comprising a hybrid network operating in a manner essentially similar to those well known heretofore.

The amplifiers, and their associated hybrid network, are in turn associated with a pair of hybrid balance controls as well as with a single gain control operating to adjust the gain of both amplifiers simultaneously. The number of adjustments are thus reduced from four (conventional heretofore) to three, by causing the gain of both amplifiers to be varied in the same sense and by substantially the same amount simultaneously. As will appear, this use of a common gain control assures that the amplifier gains in both directions are always established at substantially the same level; and as a result, setup of the equipment becomes substantially independent of amplifier gain, and reduces essentially to a hybrid balance only. While on first impression this simplification of controls may appear of little importance, it has actually proved in practice to be of tremendous value;

and the complexity of setup is reduced to substantially 25% of that normally required heretofore without appreciably detracting from the accuracy of the final setup.

The equipment is, moreover, associated with a pair of monitor jacks adapted to receive a lineman's hand set; and the arrangement is such that, as will be described, various singing currents normally present in hybrid repeaters are monitored and used directly to effect setup of the equipment. By this arrangement, therefore, and by appropriate attention to a setup procedure which will be described, the equipment can be readily set up for maximum and substantially equal gains in both directions simply by manipulating the three controls on the equipment while simultaneously listening for characteristic tone changes. The setup thus afforded can be effected in a manner of minutes, in distinction to the much longer setups which have been necessary heretofore even when highly specialized test equipment was employed.

As will also appear, the present invention is characterized by the provision of an impedance network comprising a T-pad and compensating network pre-engineered in accordance with a particular loaded line with which the equipment might be employed and incorporated into the equipment to effect a compensation of impedance changes which might appear on a particular line with which the equipment is being used. In this respect, it might be noted that it has been suggested heretofore that, when a line having a non-linear impedance characteristic is employed, the hybrid balance portion of the repeater associated with that line should have a frequency versus impedance characteristic corresponding to that of the line. As a result of this customary approach to the problem of repeaters on such lines, the hybrid networks of such repeaters have taken the form of complex impedance arrays which have themselves ordinarily required setup along with the remainder of the equipment at the time the equipment is originally installed; and as a result, the cost of the equipment and the setup time required has been increased even further.

To eliminate these problems, the present invention employs a highly simplified network shunted across the line itself and adapted to compensate for impedance variations occurring on a line, thereby to eliminate field adjustments entirely.

The foregoing objects, advantages, construction and operation of the present invention will become more readily apparent from the following description and accompanying drawings, in which.

Figure 1:
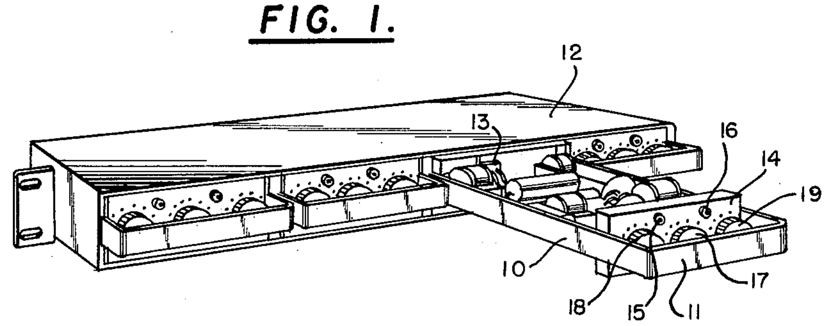
FIGURE 1 is a perspective view of a plurality of repeaters constructed in accordance with the present invention.

Referring now to FIGURE 1, it will be seen that, in accordance with the present invention, a repeater 10 may take the form of a chassis comprising a U-shaped frame member 11, the forward portion of which acts as a handle and the side portions of which act as rails adapted to mate with complementary tracks in a mounting box 12. As illustrated in FIGURE 1, a plurality of repeaters 10 may be placed in a given mounting box 12 in side-by-side relation. A commercial embodiment of the repeater 10 sold by Budelman Electronics Corporation, Stamford, Connecticut, and designated type 251A, is substantially four inches wide, one and one-half inches high, and has an overall depth of eight inches; whereby four such repeaters may be mounted in a single standard nineteen-inch mounting box having a height of one and ¾ inches.

Each of the repeaters 10 is equipped with a six-pin jack 13 on the end thereof remote form the handle portion of the chassis; and this jack 13 mates with plugs disposed at the rear of mounting box 12 whereby the repeater may be readily plugged into the rack repeater mounting box. All wiring is permanently connected to pins on the rear of each mounting box, and may be cabled in a horizontal run across the rear of the box. Only four wires are required for each repeater, namely an East line pair and a West line pair; and in addition, each mounting box includes a connection to a negative battery terminal (as will be described) as well as a ground connection.

At the forward end of the repeater unit, a panel 14 is provided having thereon a pair of monitor jacks 15 and 16, into which a lineman's hand set may be plugged for the audible setup procedure of which the present equipment is capable. In addition, this panel 14 is provided with a single gain control 17 as well as with a pair of hybrid balance controls 18 and 19 which are provided for the setup procedure to be described. Once the equipment is plugged into its associated mounting box, a lineman's hand set may be plugged first into one of the jacks 15 and then into the other; and by appropriate manipulation of the controls 17 through 19 (as will be described), the equipment can be quickly set up for efficient operation.

Figure 2:
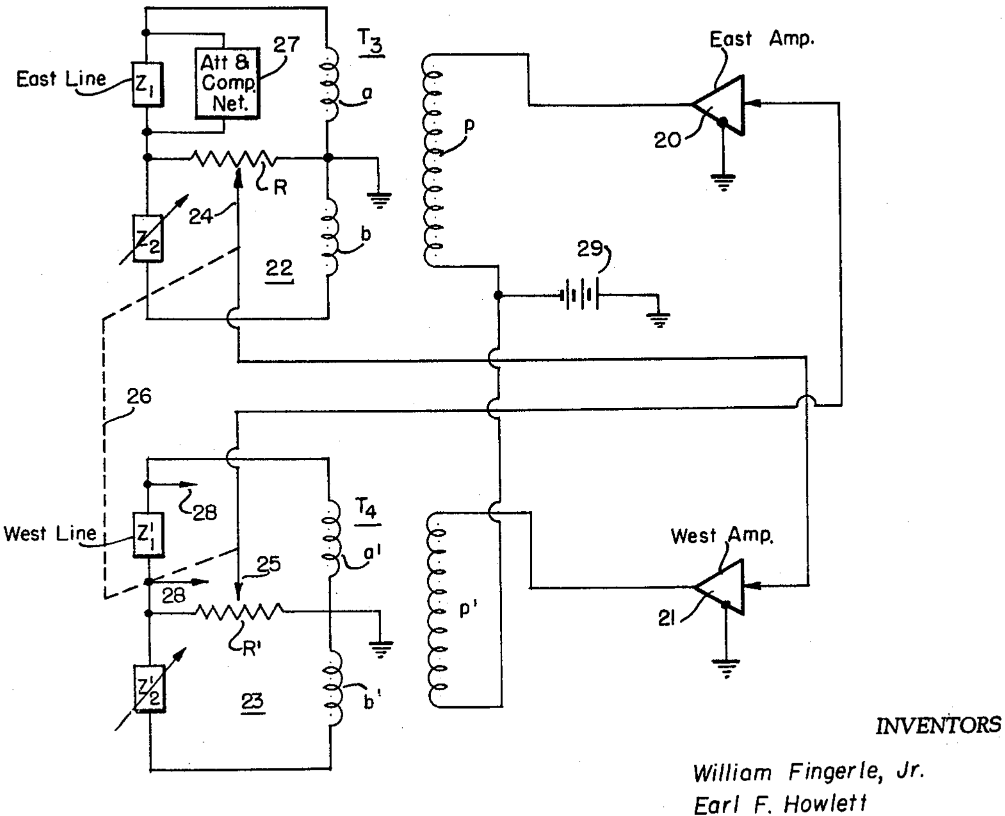
FIGURE 2 is an equivalent circuit of a voice frequency hybrid telephone repeater embodying the improvements of the present invention.

Each of the units 10 includes a plurality of components which, in simplest form, corresponds to the equivalent circuit shown in FIGURE 2. In order therefore that the general operation of the structure may first be understood, reference will now be made to FIGURE 2. The operation to be described, moreover, will be rather simplified since in its broadest aspects it corresponds to the operation of hybrid telephone repeaters which are per se well known.

As illustrated in FIGURE 2, a hybrid repeater may take the form of a network adapted to transmit and amplify voice currents from an East line designated $Z_1$ to a West line designated $Z_1'$; or in the reverse direction, namely from $Z_1'$ to $Z_1$. Amplification in the two directions is accomplished by an East amplifier 20 and a West amplifier 21 respectively; and interaction between transmissions in the two directions is prevented by hybrid networks generally designated 22 and 23, with hybrid network 22 being balanced by an East hybrid balance designated $Z_2$, and hybrid network 23 being balanced by a West hybrid balance designated $Z_2'$. The hybrid balances $Z_2$ and $Z_2'$ can take the form of an adjustable rheostat (i.e. it can be resistive only); or in the alternative, it can comprise a simple series resistor and capacitor having an impedance adjustment.

Figure 3:
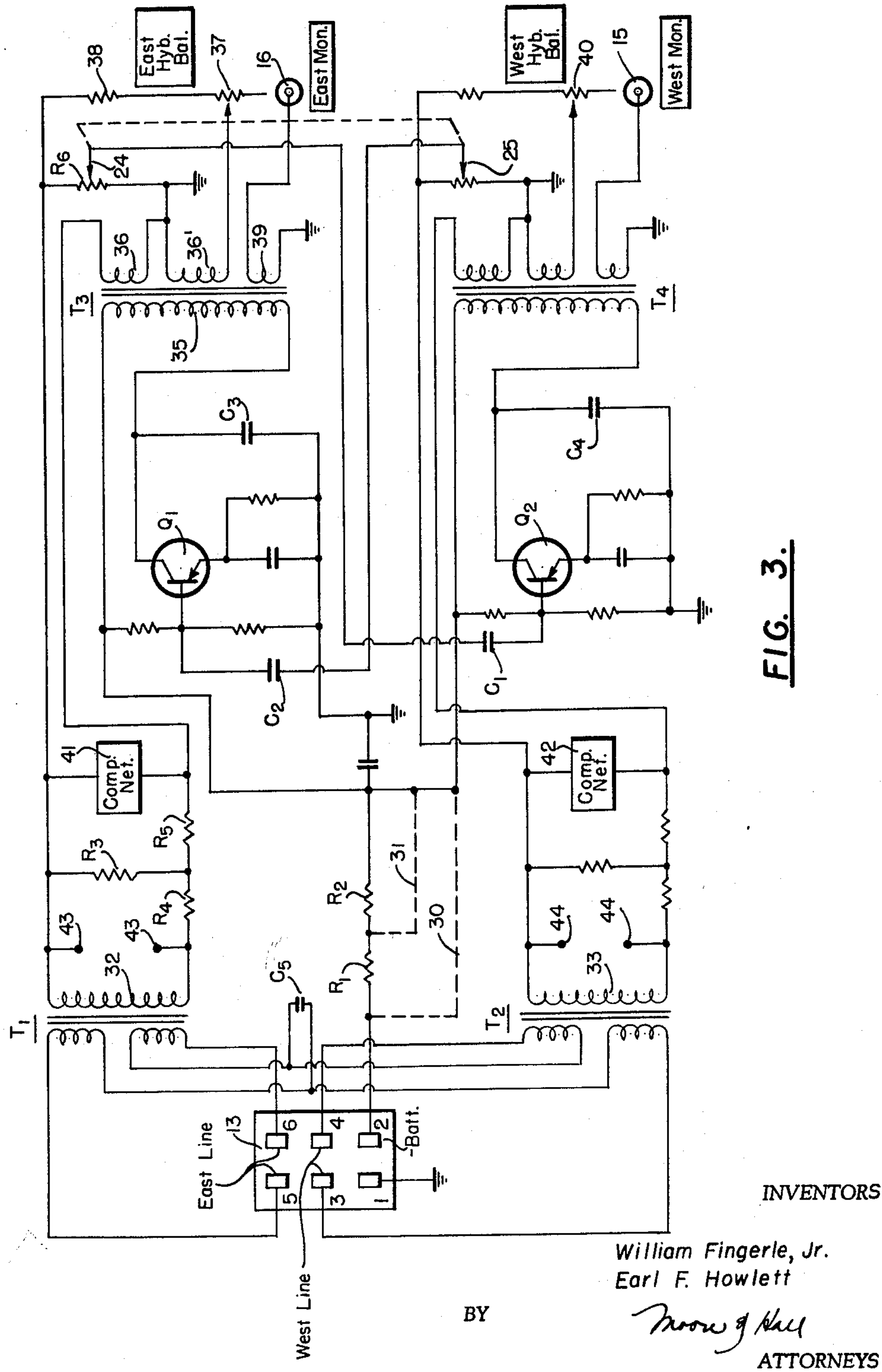
FIGURE 3 is a schematic diagram of a repeater constructed in accordance with the present invention.

The incoming and outgoing lines, and the hybrid networks, are coupled to the amplifiers 20 and 21 by transformers designated $T_3$ and $T_4$, these designations being selected to correspond to similar such designations in FIGURE 3, to be described. Transformer $T_3$ includes a primary winding *p* and a pair of secondary windings *a* and *b*, while transformer $T_4$ includes a primary winding *p'* and a pair of secondary windings *a'* and *b'*. The networks further include gain controls 24 and 25 which are ganged to one another at 26 in accordance with one of the particular improvements of the present invention. Moreover, the East line $Z_1$ may be shunted by an attenuation and compensation network 27 for the purposes already discussed above; and a similar such network may be shunted across the West line at terminals 28. The East and West portions of the circuit are entirely symmetrical.

In operation, let us first assume that a signal comes in on the East line $Z_1$. A portion of this signal is developed across the resistive portion R of gain control 24, and is fed therefrom to the input of the West amplifier 21. The output of the West amplifier appears across primary winding *p'* of transformer $T_4$ and produces a balanced voltage across the secondary windings *a'*, *b'* in the West hybrid network 23. A portion of this voltage is then fed out on the West line $Z_1'$.

If the impedance of West line $Z_1'$ and the West hybrid balance $Z_2'$ equal one another, no portion of the output of West amplifier 21 will appear across resistive portion R' of gain control 25; and accordingly no voltage from the output of West amplifier 21 will appear at the input of East amplifier 20. This is the so-called "balance condition" of the hybrid, and prevents (as is desired) the output of the West amplifier from feeding back into the East amplifier. It will be appreciated, of course, that due to the symmetry of the system, the same interaction is prevented when a signal comes in on the West line $Z_1'$ and is to be transferred to the East line $Z_1$; and no interaction between the amplifiers 20 and 21 occurs if, once more, the East hybrid 22 is "in balance." The arrangement is such that once proper balance conditions are achieved, bidirectional amplification, without interaction, is effected.

If we should assume now that the hybrids 22 and 23 are in an unbalanced condition, then when a signal is being transferred from East line $Z_1$ to West line $Z_1'$, a portion of the output of West amplifier 21 will be developed across resistive portion R' of gain control 25 and will be fed therefrom back to the input of East amplifier 20 and thence, through the East hybrid network 22, back to the input of West amplifier 21. This feedback current causes an oscillating condition to occur in both amplifiers; and characteristic sounds, designated "howl" or "singing condition" or a "hollow" sound, can be detected by causing the oscillating current to be monitored. Similarly, by so monitoring these oscillating currents, and by effecting appropriate adjustments of the gain control 22–25, and the hybrid controls $Z_2$ and $Z_2'$, changes in the sound being monitored and the achieving of a null condition can be utilized to set up the equipment; and such monitoring is in fact employed, as will be described, in the setup of the hybrid repeater of the present invention.

The amount of signal feedback which occurs during an unbalanced condition of the hybrids depends upon both the hybrid balance setting of the controls $Z_2$ and $Z_2'$ and upon the setting of the gain control 24 or 25 in a given one of the hybrids 22 and 23. In known hybrid repeaters it is very difficult to achieve balance since four controls (two hybrid balance controls and two gain controls) must be adjusted concurrently. It is therefore entirely possible, and indeed an ordinary circumstance, for the entire system to be misadjusted so as to give less than optimum gain, or unequal gains in the two directions; and ordinarily proper setup of the repeater requires special test and setup equipment and consumes a great deal of time to achieve optimum and equal gains in both directions. The essential purpose of the present invention is to permit easier and quicker setups as well as to effect the simplifications in circuit design already discussed.

In achieving the foregoing purposes, the first significant feature to be noted is that the gain controls 24 and 25 are, as already discussed, ganged to one another at 26 whereby gain adjustments represent a single control function rather than the dual control function which has been characteristic of prior systems. As a result of this arrangement, the gain of both amplifiers is in effect caused to be varied in the same sense and by substantially the same amount simultaneously; and the end result is that the amplifier gains in both directions are always established at substantially the same level. Accordingly, setup operations become substantially independent of amplifier gain and reduce essentially to hybrid balance only. In actual installations, this has a tremendous practical advantage.

The attenuating and compensating network 27 (and the similar such network which can be coupled to terminals 28) is also of importance in simplifying the structure and operation of the amplifier. As will be described, the attenuation portion of the network 27 may take the form of a resistive T-pad shunted across the East line (with another such pad being shunted across the West line) and this pad reduces the complexity of the balance problem by minimizing telephone line impedance variations when the line is caused to be open-circuited or short-circuited (i.e. when the line is not in use). The compensation portion of the network 27 is of particular value when the repeater is employed in conjunction with variable impedance telephone lines which exhibit an impedance versus frequency characteristic which varies over the range of voice current frequencies being amplified.

It has been the practice heretofore, when repeaters are employed with such variable impedance lines, to utilize hybrid balance networks for the illustrated impedances $Z_2$ and $Z_2'$ which exhibit an impedance versus frequency characteristic the same as that of the loaded line. The impedances $Z_2$ and $Z_2'$ have accordingly taken the form of complex costly impedance networks which themselves have to be set up in the field to correspond to the impedance variations which may be exhibited on a particular line; and this in turn has caused the cost of repeaters and the time of setup to be increased considerably.

In accordance with the present invention, however, it is recognized that variable impedance telephone lines commercially available have impedance versus frequency characteristics which are well defined; and rather than trying to match this characteristic in the hybrid balance portion of the network, the present invention contemplates the utilization of a compensation network (in unit 27) which exhibits an impedance versus frequency characteristic substantially reciprocal to that of the particular loaded line involved. Since the characteristics of loaded telephone lines in commercial lines are well known, the compensating portion of network 27 used in the repeater of the present invention is pre-engineered to compensate the repeater for use with a given variable impedance line; and the compensating portion of network 27 can thereby be reduced to its simplest and most economical form, usually a small network consisting of a single resistor, single capacitor, and single inductance.

The purpose of the compensating network having an impedance characteristic reciprocal to that of the line is also to reduce and counteract the effects of impedance variations on the line whereby the inputs of the repeater amplifiers sees a substantially smaller impedance variation than would otherwise occur as a result of the variable impedance characteristic of the line. This arrangement simplifies the overall structure of the repeater and of the hybrid balance portion thereof; and eliminates field adjustments of the compensating network. As a result, the overall repeater can be far simpler and can be set up far more quickly than has been possible heretofore.

A particular embodiment of the present invention is shown in FIGURE 3. As illustrated, signals are coupled to and taken from the repeater at the six-pin jack 13 (referred to in FIGURE 1); and the six pins of this jack have been designated by the numerals 1 through 6 inclusive. Pin 1 is, as illustrated, a common ground connection, while pin 2 is a negative battery connection. In practice a battery such as 29 (see FIGURE 2) may be connected across pins 1 and 2 to supply operating potentials for the transistor amplifiers, to be described; and this battery may be self-contained in the equipment, or may comprise an operating battery located at the central station.

The battery itself may provide outputs of 12, 24, or 48 volts D.C.; and a voltage divider comprising resistors $R_1$ and $R_2$ in association with removable straps 30, 31 is provided to adapt the equipment for the particular battery voltage actually available. Strap 30 is utilized when a 12-volt source is available, thereby to short-circuit both of dropping resistors $R_1$ and $R_2$; strap 31 is utilized when a 24-volt supply is available, thereby to short-circuit only resistor $R_2$; and neither strap is employed when a 48-volt supply is available, whereby both of dropping resistors $R_1$ and $R_2$ are utilized.

The East line is inserted between pins 5 and 6, while the West line is inserted between pins 3 and 4 of the jack 13; and for purposes of simplicity, the actual telephone lines have not been illustrated. An input transformer arrangement $T_1$, $T_2$ is also provided, coupled as shown to the pins 3 through 6 inclusive to isolate the hybrid networks from the telephone line and to provide signalling bypass (i.e. a bypass for low frequency ringing signals). The transformer arrangement $T_1$, $T_2$ also provides a D.C. path bypassing the repeater for D.C. dialing and talking currents, but acts to connect the repeater into the telephone line at frequencies between 300 and 3000 cycles. The arrangement of transformers $T_1$ and $T_2$ is such that they provide a precision balanced impedance in series with both sides of the line and off ground to isolate central office equipment unbalances thereby to minimize noise problems. Transformers $T_1$ and $T_2$ are preferably of the line-to-line type, having a 1000 ohm input and output impedance to match 900–1100 ohm impedance plant facilities, although they may also be tapped or otherwise modified to match other impedances.

Voice signals appearing on the East line between pins 5 and 6 are coupled through transformer $T_1$ to the secondary winding 32 thereof, while voice currents appearing on the West line between pins 3 and 4 are coupled through transformer $T_2$ to the secondary winding 33 thereof. Secondary winding 32 is shunted by a T-pad attenuation network comprising resistors $R_3$, $R_4$ and $R_5$ (a similar such pad being shunted across secondary winding 33 of transformer $T_2$). Resistors $R_3$ through $R_5$, as well as their counterparts in the West line portion of the circuit, form a passive 1000 ohm, 3 db loss network acting to slightly isolate the telephone line from the hybrid network. If the East line is open-circuited, the East pad presents no higher than a 1150 ohm impedance reflected back toward its hybrid; and if the line is short-circuited, an impedance of not less than 300 ohms is reflected back toward its hybrid. As a result, impedance variations during open and short-circuit conditions of the line are vastly reduced.

The amplifiers 20 and 21 (FIGURE 2) take the form of transistors $Q_1$ and $Q_2$ arranged in conventional common emitter amplifier circuits to provide a maximum working gain of about 35 db each. In practice, it has been found that the transformer hybrid and pad losses exhibited in the overall repeater account for about 15 db of that capability, with the remainder of about 20 db being available for line use under optimum conditions. The audio input to each of the transistors $Q_1$ and $Q_2$ is applied off ground and into the base of its associated transistor. By way of example, and comparing FIGURES 2 and 3, signals from the East line are developed across resistor $R_6$ (corresponding to R of hybrid network 22 in FIGURE 2) and are taken from gain control 24 through a coupling capacitor $C_1$ to the base of transistor $Q_2$ comprising the West amplifier. Similarly, the input to transistor $Q_1$ is derived from gain control 25 and is coupled through coupling capacitor $C_2$ to the input of transistor $Q_1$.

The output of East transistor amplifier $Q_1$ is developed across the primary winding 35 of transformer $T_3$ (corresponding to winding *p* of transformer $T_3$ in FIGURE 2); while the output of transistor amplifier $Q_2$ is similarly developed across transformer $T_4$. The collector A.C. output of each of transistor amplifiers $Q_1$ and $Q_2$ is bypassed to ground in increasing amounts at higher frequencies by the action of roll-off capacitor $C_3$ in the East amplifier, and $C_4$ in the West amplifier; and the purpose of these roll-off capacitors is to reduce the output of the amplifiers at frequencies above 3000 cycles and to increase the singing path losses above the desired audio frequency range. Capacitors $C_3$ and $C_4$ also provide convenient surge voltage suppression to protect their associated transistor collectors.

The transistor output hybrid transformer $T_3$ in the East amplifier (and transformer $T_4$ in the West amplifier) is equipped with two secondary windings. One of these windings designated 36—36' is center-tapped to ground as shown, and is provided to effect a balanced voltage corresponding to the balanced voltage appearing across the windings *a–b* of FIGURE 2. In this respect, therefore, the connection of winding portions 36, 36' and the gain control 24 corresponds to that already described in FIGURE 2. By the same token, the lower end of winding portion 36' is coupled to adjustable impedance 37 (which may be series connected to a fixed resistance 38, and which may further include a series capacitor, if desired) whereby the portion of the circuit 37—38 corresponds to and is connected in the manner of hybrid balance control $Z_2$ of FIGURE 2. The second secondary winding 39 on transformer $T_3$ is a monitor winding which is connected to jack 16 (see FIGURE 1) and acts to provide a means of monitoring the signal currents by a lineman's handset, during setup of the equipment.

It will be appreciated by examination of FIGURE 3 that the West amplifier and hybrid portions of the system are symmetrical to the East portions of the system already described; and this description will not be repeated.

The gain control 24–25 in the East and West portions of the system are ganged to one another for the purposes already described. Moreover, the adjustable impedance 40 in the West portion of the repeater is the West hybrid balance control corresponding to the East hybrid balance control 37. As a result, and as illustrated in FIGURE 1, the system includes three controls comprising the East and West hybrid balances 37 and 40, the common gain control 24–25, and also provides a pair of monitoring jacks 15 and 16 to which the lineman's handset may be coupled during setup.

The compensation network 41 corresponds to the compensation portion of network 27 already described; and is provided as also described to reduce impedance variations at the input of the amplifier $Q_2$ when the telephone line is of the variable impedance type. Similarly the compensation network 42 acts to reduce impedance variations at the input of transistor amplifier $Q_1$. It should be noted that the compensation networks 41 and 42, rather than being connected to the right of the loss pads (as actually illustrated) could be connected on the other side thereof, e.g. at terminals 43 for one side of the system and at terminals 44 for the other side.

The overall system shown in FIGURE 3 may thus be summarized by stating that it contains two identical transistor amplifiers, one to amplify voice currents in the East-to-West direction, and the other to increase the signal level of voice currents in the West-to-East direction. The amplifiers are prevented from interacting one into the other by the directional circuit devices, i.e. the hybrid networks, and as also illustrated, these hybrid networks consist of a specially designed center-tapped transformer whose output is applied to two arms of a balanced bridge (compare FIGURE 2). One arm of this bridge is the telephone line, and the second arm of the bridge network is the hybrid balance control circuit. When the hybrid balance control $Z_2$, $Z_2'$ (or 37, 40) is set to duplicate the impedance of the telephone line, equal and opposite currents flow through the center of the bridge, causing cancellation of voltage at that point. By connecting the two amplifiers in the center arm of the balanced bridge, therefore, the voice frequency output of one amplifier is prevented from entering the input of the second amplifier.

At any time when the loss of the signal due to balanced cancellation is less than the gain of the two amplifiers, a ring-around path will exists which causes the amplifiers to oscillate at the frequency of the least loss; and this electrical loop is called the singing path. "Singing" and "hybrid howling" oscillatory signals are heard when the amplifier gains exceed the singing path losses. The more precisely the hybrid balance network impedance duplicates the telephone line impedance, the greater the singing path loss and consequently the higher usable gain obtainable from the two amplifiers before the singing point is reached. With a poorly adjusted hybrid balance network, a very small amount of amplifier gain will overcome the low loss of the hybrids and result in singing at very low gain control settings. It is seen therefore that the successful operation of the hybrid repeater, indeed of any hybrid repeater, is dependent upon the quality of the hybrid balance control settings in both directions.

The occurrence of singing currents at off-balance settings permits these currents, monitored at jacks 16 and 15, to be utilized in actually setting up the equipment; and as a result the system can be set up far more quickly than has been possible heretofore. A typical setup procedure can be as follows:

Upon installation of the repeater into its mounting box, a lineman's or central office test handset is first inserted into the West monitor jack 15. The common gain control 24–25 is then rotated until a hybrid howl or singing condition begins, whereafter the gain control is lowered slightly until the howl just stops. A call is preferably then completed between two standard telephone sets over the line in which the repeater has been installed; and if such call is placed, it should not be placed with another lineman's test set, since its impedance is not the same as a standard telephone station instrument. With the test call in talking condition (i.e. the line is then neither short-circuited nor open-circuited), the gain control is again raised until the singing condition returns. The East hybrid balance control 37 is then rotated until the singing either stops or suddenly makes a distinctive change in pitch.

The lineman's handset is then removed from jack 15 and inserted in jack 16. If no howl is detected, the gain control is increased until a singing condition once more starts. With the repeater in this singing condition, the West hybrid balance control 40 is adjusted until the singing stops or makes a distinctive change in pitch.

The objective in the balancing procedure described above is of course to set the East and West hybrid balance controls in the position which permits the highest gain control setting without a hybrid howling condition. The singing can, of course, be stopped at any time by simply lowering the gain control. After both balance controls have been set to obtain the highest gain control without singing, the gain control should be raised to the point where singing just returns; and if necessary, the hybrid balance controls can then be separately finally adjusted to the point where the singing tone changes from a low pitch to a high pitched tone, with the controls preferably being set so that the high pitch tone persists as near to the point of low pitched singing as possible. With this condition achieved, the gain control can be again lowered very slightly until the high pitched singing stops. The parties on the test call should be requested to hang up their telephones to unterminate both sides of the repeater. The maximum practical usable gain is now determined by the idle line condition singing points, and the gain control should accordingly be set as high as possible without singing, or at a point where the repeater sings at a low level not causing cross-talk interference into other circuits along the same line route. The gains in the two operating directions will be equal, so long as the hybrid networks are equally balanced; but they may vary slightly with different line connections.

After a proper initial setting, the gain balance in the two operating directions may vary on the order of 1.5 db for each 100 ohms of line impedance departure from the initial setting values; but this low value of variation is entirely tolerable and will not in fact be ordinarily noticed in practice.

If desired, although it is entirely unnecessary, test equipment can be employed in place of a lineman's handset. For example, a "tone null" method of balance can be utilized in which a tone of about 1400 cycles is inserted successively into the East and West monitor jacks 16 and 15; and the gain and hybrid controls are then adjusted to achieve a null point. To effect an even more precise setting a pair of vacuum tube volt meters can be coupled to the two monitors jacks 15 and 16 respectively, whereby the voltage outputs at these jacks can be simultaneously observed. The repeater is caused to sing by raising the gain control; and the hybrid balance controls are adjusted to produce equal singing conditions on the two monitor jacks. By observing the vacuum tube volt meters coupled to jacks 15 and 16, the equipment may be aligned not only to obtain equal voltages from both monitor jacks at any one singing power level, but also to make the two voltages track equally downward as the gain control is decreased through the near singing condition into a non-singing condition. Indeed, in those cases where a tone source (e.g. an oscillator) and two vacuum tube volt meters are available for alignment, the tone source can be connected, for example across capacitor $C_5$ (in the center of the signal bypass circuitry) to further speed final adjustment. When the hybrid balance controls are improperly adjusted, the voltage on the two monitor jacks will vary in different directions and at unequal rates with a slight change in either hybrid balance control adjustment; but at the desired point of equal gains, or exact hybrid balance control adjustment, the two monitor jack voltages will lock together, and will vary in the same direction and in equal amounts with a slight touch on either hybrid balance control.

It will be appreciated that the technique utilizing test equipment, described above, need be employed only when a highly sophisticated adjustment is desired for some reason; and in practice, such sophistication is not necessary. Entirely adequate and noticeable improvement can be achieved through the use of a lineman's handset alone.

While we have thus described a preferred embodiment of our invention, many variations will be suggested to those skilled in the art. It must therefore be stressed that the foregoing description is meant to be illustrative only and should not be considered limitative of our invention; and all such variations and modifications as are in accord with the principles described, are meant to fall within the scope of the appended claims.

Having thus described our invention, we claim:

1. A voice frequency repeater comprising a pair of amplifiers having inputs and outputs, transformer coupling means for coupling said inputs and outputs to a telephone line to effect bidirectional amplification of voice currents on said telephone line, means for preventing said amplifiers from interacting with one another during said bidirectional amplification comprising a pair of hybrid networks coupled to said amplifiers and to spaced points on said telephone line respectively, each of said pair of hybrid networks including a variable impedance adjustable independently of the variable impedance in the other of said hybrid networks for individually varying the impedances of each said hybrid network relative to the impedance of said telephone line, common gain control means coupled to both said amplifiers for variably establishing and maintaining the gain of both said amplifiers at substantially the same level during individual adjustments of said pair of variable impedances in said hybrid networks, said transformer coupling means including an extra winding acting as a monitor winding, and a jack connected to said monitor winding for separably connecting said monitor winding to a lineman's hand set to provide an audible indication of the balance conditions of said hybrid networks during variations of said pair of variable impedances and of said common gain control means.

2. The structure of claim 1 wherein each of said hybrid networks includes, in addition to said variable impedance, a potentiometer supplying a signal to the input of one of said amplifiers, the two potentiometers in said pair of hybrid networks being ganged to one another and being thereby simultaneously adjustable to effect said common gain control.

3. A voice frequency repeater comprising a pair of amplifiers, first transformer means for coupling said amplifiers between spaced points on a telephone line to effect bidirectional amplification of voice currents on said line, a pair of adjustable hybrid networks coupled between said spaced points on said telephone line and said amplifiers respectively for preventing interaction of said amplifiers during said bidirectional amplification, said hybrid networks being coupled to said amplifiers by second transformer coupling means located respectively between said hybrid networks and the inputs to said amplifiers, and monitor means comprising extra winding means on said second transformer coupling means adapted to be jacked to a telephone lineman's handset for providing an audible indication of the balance condition of said hybrid networks, usable in balancing said networks, during adjustment of said networks.

4. A voice frequency repeater comprising a pair of transistor amplifiers, means for coupling said amplifiers between spaced points on a telephone line to effect bidirectional amplification of voice currents on said line, a pair of individually adjustable balancing networks coupled between said spaced points on said line and said amplifiers for reducing interaction of said amplifiers during said bidirectional amplification, a pair of variable impedances each of which is shunted across one of said spaced line points and one of said indivdiually adjustable balancing networks, at least a portion of each of said variable impedances being coupled between ground and the base to said transistor amplifiers to provide inputs therefor the magnitude of which inputs depends on the magnitude of said variable impedance, and adjustment means mechanically connecting said pair of variable impedances to one another for causing the individual adjustment of said balancing networks to be rendered substantially independent of gain differences in said amplifiers.

5. The system of claim 4 including a pair of transformer means coupling output electrodes of said transistor amplifiers to said pair of adjustable balancing networks respectively, said pair of coupling transformer means each including monitor means comprising extra winding means for auditing singing currents present in said repeater during variations in said adjustable balancing networks and adjustment means.

6. A voice frequency repeater, means for coupling said repeater between spaced points on a telephone line to effect bidirectional amplification of voice currents on said line, said repeater including terminals adapted to be connected to said spaced points, said coupling means comprising a first pair of transformer means coupled to said terminals for coupling signals to and from said repeater, portions of said first pair of transformer means also being connected to reactive impedance means operative to provide a signalling bypass circuit between said spaced points, whereby said first pair of transformer means couple audio signals to said repeater for amplification and also operate to bypass D.C. and ringing signals around said repeater, said repeater further including a pair of amplifiers for effecting said bidirectional amplification, a second pair of transformer means connected respectively between said first pair of transformer means and the outputs of said pair of amplifiers, a pair of adjustable balancing networks for reducing interaction of said amplifiers during said bidirectional amplification, means coupling said balancing networks to said interconnected pairs of transformers, said coupling means including a pair of variable impedances coupled respectively to the inputs of said amplifiers for controlling the gains of said amplifiers, and means for simultaneously varying the magnitude of said pair of impedances in like amount and sense during adjustment of said balancing networks thereby to cause the adjustment of said balancing networks to be rendered substantially independent of gain differences in said amplifiers, one of said pair of transformer means including extra winding means for monitoring singing currents during said adjustment.

7. The repeater of claim 6 wherein said pairs of transformers are interconnected to one another by means including T-pad attenuation networks.

References Cited by the Examiner

UNITED STATES PATENTS

| | | | |
|---|---|---|---|
| 1,404,288 | 1/22 | Harden | 179—170 |
| 1,516,519 | 11/24 | Crisson | 179—170 |
| 1,570,215 | 1/26 | Fry | 179—170 |
| 1,734,113 | 11/29 | Clark | 179—170 |
| 1,937,796 | 12/33 | Smith et al. | 333—8 |
| 2,017,923 | 10/35 | Shackleton | 179—170 |
| 2,209,955 | 8/40 | Black | 179—170 |
| 2,343,471 | 3/44 | Nixon | 333—14 |
| 2,517,960 | 8/50 | Barney et al. | 179—170 |
| 2,601,302 | 6/52 | Lalande | 179—170 |
| 2,812,388 | 11/57 | Thomas | 179—170 |

ROBERT H. ROSE, *Primary Examiner.*

WALTER L. LYNDE, *Examiner.*